United States Patent
Miyazaki

(10) Patent No.: US 9,890,271 B2
(45) Date of Patent: Feb. 13, 2018

(54) RUBBER COMPOSITION FOR TIRE AND PNEUMATIC TIRE

(71) Applicant: SUMITOMO RUBBER INDUSTRIES, LTD., Kobe-shi (JP)

(72) Inventor: Tatsuya Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/277,279

(22) Filed: May 14, 2014

(65) Prior Publication Data

US 2015/0011676 A1  Jan. 8, 2015

(30) Foreign Application Priority Data

Jul. 8, 2013  (JP) .................... 2013-142877

(51) Int. Cl.
  *C08K 3/22*  (2006.01)
  *C08L 9/00*  (2006.01)
  *C08L 9/06*  (2006.01)
  *C08K 3/36*  (2006.01)
  *C08K 5/548*  (2006.01)
  *B60C 1/00*  (2006.01)

(52) U.S. Cl.
  CPC .............. *C08L 9/06* (2013.01); *B60C 1/0016* (2013.01); *C08K 3/22* (2013.01); *C08K 3/36* (2013.01); *C08K 5/548* (2013.01); *C08L 9/00* (2013.01); *C08K 2003/2227* (2013.01); *C08K 2201/003* (2013.01); *C08L 2205/02* (2013.01); *C08L 2205/03* (2013.01)

(58) Field of Classification Search
  CPC .... C08K 3/20; C08K 3/04; C08K 3/22; B60C 1/0016
  See application file for complete search history.

(56) References Cited

U.S. PATENT DOCUMENTS

| | | | |
|---|---|---|---|
| 6,242,522 B1 * | 6/2001 | Ezawa et al. | 524/437 |
| 7,338,999 B2 * | 3/2008 | Yagi et al. | 524/493 |
| 7,960,463 B2 * | 6/2011 | Pan et al. | 524/424 |
| 2009/0281225 A1 * | 11/2009 | Eto | C08G 59/621 524/437 |
| 2015/0005433 A1 * | 1/2015 | Furuhata | 524/495 |

FOREIGN PATENT DOCUMENTS

JP  4559573 B  10/2010

* cited by examiner

*Primary Examiner* — Vickey Nerangis
(74) *Attorney, Agent, or Firm* — Oblon, McClelland, Maier & Neustadt, L.L.P.

(57) ABSTRACT

A rubber composition for a tire includes a rubber component, aluminum hydroxide particles having an average particle diameter in a range of 1.5 μm or smaller and a nitrogen adsorption specific surface area of 3~60 m$^2$/g, and wet silica. The aluminum hydroxide particles are in an amount of 1~60 parts by mass relative to 100 parts by mass of the rubber component, and the rubber composition is obtained by a process including kneading at least the rubber component and the aluminum hydroxide particles at a discharge temperature in a range of 150° C. or higher.

20 Claims, 1 Drawing Sheet

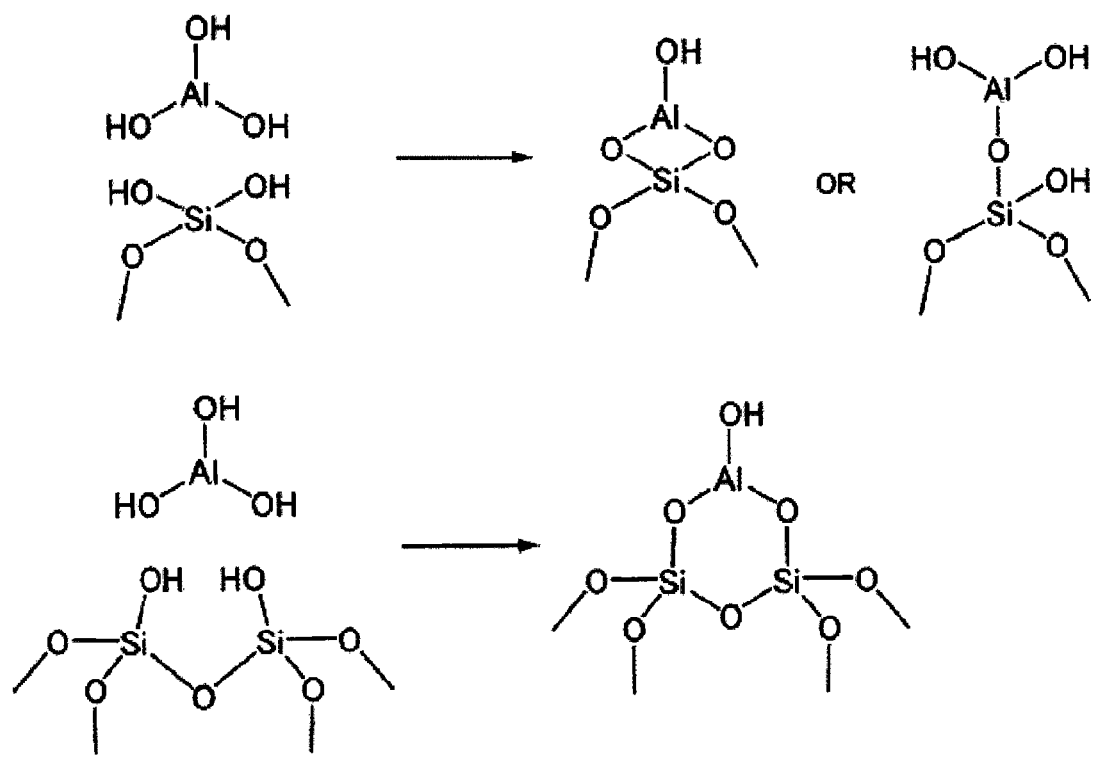

RUBBER COMPOSITION FOR TIRE AND PNEUMATIC TIRE

CROSS-REFERENCE TO RELATED APPLICATIONS

The present application is based upon and claims the benefit of priority to Japanese Patent Application No. 2013-142877, filed Jul. 8, 2013, the entire contents of which are incorporated herein by reference.

BACKGROUND OF THE INVENTION

Field of the Invention

The present invention relates to a rubber composition for tires and a pneumatic tire having a tread produced using the rubber composition.

Description of Background Art

A pneumatic tire is structured with various components such as a tread and a sidewall, and is provided with properties corresponding to those components. Japanese Patent Publication 4559573 describes a method for improving wet grip performance, wear resistance and processability by using a particular rubber component or a particular inorganic reinforcement agent such as aluminum hydroxide. However, further improvement is required. The entire contents of this publication are incorporated herein by reference.

SUMMARY OF THE INVENTION

According to one aspect of the present invention, a rubber composition for a tire includes a rubber component, aluminum hydroxide particles having an average particle diameter in a range of 1.5 μm or smaller and a nitrogen adsorption specific surface area of 3~60 m²/g, and wet silica. The aluminum hydroxide particles are in an amount of 1~60 parts by mass relative to 100 parts by mass of the rubber component, and the rubber composition is obtained by a process including kneading at least the rubber component and the aluminum hydroxide particles at a discharge temperature in a range of 150° C. or higher.

According to another aspect of the present invention, a method for producing a rubber composition for a tire includes combining a rubber component and aluminum hydroxide particles having an average particle diameter in a range of 1.5 μm or smaller and a nitrogen adsorption specific surface area of 3~60 m²/g, and kneading a mixture including the rubber component and the aluminum hydroxide particles at a discharge temperature in a range of 150° C. or higher. The rubber composition includes the rubber component, the aluminum hydroxide particles, and wet silica, and the aluminum hydroxide particles are in an amount of 1~60 parts by mass relative to 100 parts by mass of the rubber component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a view schematically showing an instantaneous reaction that could occur between the aluminum hydroxide on the tire surface and silica on a road surface.

DETAILED DESCRIPTION OF THE EMBODIMENTS

The embodiments will now be described with reference to the accompanying drawings, wherein like reference numerals designate corresponding or identical elements throughout the various drawings.

The rubber composition for tires according to an embodiment of the present invention is obtained by combining a rubber component with aluminum hydroxide having an average particle diameter and a nitrogen adsorption specific surface area respectively set at specific predetermined values along with wet silica, and by kneading at least the rubber component and the aluminum hydroxide at a predetermined discharge temperature.

Wet grip performance is improved by adding aluminum hydroxide. That is thought to be because effects (1)~(3) below are exhibited alone or in combination thereof.

(1) During the kneading process, part of the combined aluminum hydroxide is converted to alumina having a Mohs hardness equal to or higher than that of silica, or part of the aluminum hydroxide is bonded with silica as shown in FIG. 1 so as to be immobilized. The alumina block and aluminum hydroxide are thought to exhibit anchoring effects, thereby enhancing wet grip performance.

(2) When silicon dioxide on the road surface and aluminum hydroxide on the tire surface make contact with each other (chafe) during running, an instantaneous bonding as shown in FIG. 1 is thought to occur, thereby enhancing wet grip performance.

(3) On a wet road surface, a portion of the tire surface is in contact with the road surface via a water screen. Usually, the water screen is thought to evaporate by the frictional heat generated on the portion where the tire makes direct contact with the road surface. However, when aluminum hydroxide is contained, the frictional heat is thought to contribute to progression of endothermic reactions represented by "Al(OH)$_3$→½ Al$_2$O$_3$+$\frac{3}{2}$ H$_2$O" in the aluminum hydroxide on the tire surface, thereby suppressing evaporation of the water screen (water content). If the water screen evaporates, since a space is formed between the tire surface and the road surface, the contact area of the road surface and the tire is reduced, and wet grip performance is lowered.

As described above, although wet grip performance is improved by the effects of adding aluminum hydroxide, wear resistance and roll processability are usually lowered. Thus, it is hard to achieve balanced improvement of those features. The rubber composition according to an embodiment of the present invention contains aluminum hydroxide having an average particle diameter and a nitrogen adsorption specific surface area respectively set at specific predetermined values as well as wet silica, and is obtained by kneading a rubber component and the particular aluminum hydroxide at a predetermined discharge temperature. Thus, well-balanced effects of (1)~(3) above are exhibited so as to significantly improve wet grip performance and achieve excellent wear resistance and roll processability, thereby significantly improving performance balance of those features.

The rubber composition for tires related to the present invention is not limited specifically as long as it contains a rubber component, aluminum hydroxide having an average particle diameter and a nitrogen adsorption specific surface area respectively set at specific predetermined values along with wet silica, and is obtained by a method for kneading at least a rubber component and the particular aluminum hydroxide at a predetermined discharge temperature. For example, the rubber composition is preferably obtained by a method that includes a base kneading step for kneading a rubber component, the aforementioned particular aluminum hydroxide and wet silica at 150° C. or higher; and a finish kneading step for kneading a vulcanization accelerator and the kneaded material obtained in the base kneading step.

A rubber component is not limited to a specific type; examples include isoprene rubbers such as natural rubber (NR) and isoprene rubber (IR), and diene rubbers such as butadiene rubber (BR), styrene-butadiene rubber (SBR), styrene-isoprene-butadiene rubber (SIBR), chloroprene rubber (CR) and acrylonitrile-butadiene rubber (NBR). Among those, isoprene rubbers, BR and SBR are preferred because excellent durability is obtained while ensuring excellent steering stability, fuel efficiency and elongation at break. Using both BR and SBR is preferred for summer tires, and using both BR and isoprene rubber is preferred for studless tires, since performance on ice is also important.

As for a BR, it is not limited specifically. Examples are those generally used in the tire industry: BR with a high-cis content, BR containing the crystal of 1,2-syndiotactic-polybutadiene (SPB), BR synthesized using a rare-earth element-based catalyst and the like. Among those, rare-earth BRs are preferred because excellent durability is obtained while ensuring excellent steering stability, fuel efficiency and elongation at break.

As for rare-earth BRs, known types are used: for example, those synthesized using a rare-earth element-based catalyst (catalysts containing a lanthanide series rare-earth compound, organoaluminum compound, aluminoxane, compound containing halogen, and a Lewis base as needed). Especially, an Nd-based BR synthesized using a neodymium-based catalyst is preferred.

As for isoprene natural rubbers, those generally used in the tire industry such as SIR 20, RSS #3, TSR 20 and the like may be used. Also, IRs generally used in the tire industry such as IR 2200 and the like may be used. SBRs are not limited to any specific type; for example, an emulsion-polymerized SBR (E-SBR), a solution-polymerized SBR (S-SBR), a modified SBR for combining silica which is modified by a compound capable of interacting with silica, and the like may be used. Especially, a modified SBR for combining silica is preferred since it has an excellent capability of dispersing silica because of its intense interaction with silica, and fuel efficiency and wear resistance are improved accordingly.

Examples of a modified SBR for combining silica are known types such as SBRs in which a polymer end or main chain is modified by various modifying agents: for example, modified SBRs described in Japanese laid-open patent publications 2010-077412, 2006-274010, 2009-227858, 2006-306962, 2009-275178 and the like. A preferred example is a modified SBR obtained by a reaction with a modifying agent represented in general formula (1) below and having an Mw of $1.0 \times 10^5 \sim 2.5 \times 10^6$.

Formula 1

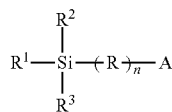

(1)

(in the formula, "n" indicates a whole number of 1~10, "R" indicates a divalent hydrocarbon group (such as —$CH_2$—), $R^1$, $R^2$ and $R^3$ each indicate independently a hydrocarbyl group having 1~4 carbon atoms or a hydrocarbyloxy group having 1~4 carbon atoms, at least one of $R^1$, $R^2$ and $R^3$ is a hydrocarbyloxy group, and "A" indicates a functional group having a nitrogen atom)

In an embodiment of the present invention, the amount of conjugated styrene of a modified SBR for combining silica is preferred to be 25 mass % or more, more preferably 27 mass % or more. If the amount is less than 25 mass %, wet grip performance tends to be lowered. Also, the amount of conjugated styrene is preferred to be 50 mass % or less, preferably 45 mass % or less, even more preferably 40 mass % or less. If the amount exceeds 50 mass %, fuel efficiency may decrease. The amount of styrene is obtained through $H^1$-NMR measurement.

Regarding aluminum hydroxide having an average particle diameter and a nitrogen adsorption specific surface area respectively set at specific predetermined values, the average particle diameter of the aluminum hydroxide is set at 1.5 μm or smaller, preferably at 0.69 μm or smaller, more preferably at 0.6 μm or smaller. The average particle diameter is set at 0.2 μm or larger, more preferably at 0.25 μm or larger, even more preferably at 0.4 μm or larger. If the average particle diameter exceeds 1.5 μm, wear resistance and wet grip performance may decrease, and if it is smaller than 0.2 μm, roll processability may be lowered. The average particle diameter of aluminum hydroxide is a number average particle diameter, and is measured by using a transmission electron microscope.

The nitrogen adsorption specific surface area ($N_2SA$) of the aluminum hydroxide is set at 3~60 $m^2/g$. If it is beyond such a range, wear resistance and wet grip performance may deteriorate. The lower limit of the $N_2SA$ is preferred to be 6 $m^2/g$ or greater, more preferably 12 $m^2/g$ or greater, and the upper limit is preferred to be 50 $m^2/g$ or lower, more preferably 40 $m^2/g$ or lower, even more preferably 20 $m^2/g$ or lower. The $N_2SA$ of aluminum hydroxide is the value measured by a BET method in accordance with ASTM D3037-81.

From the viewpoints of ensuring wear resistance and wet grip performance of a tire while suppressing metal wear of a Banbury mixer and extruding equipment, the Mohs hardness of the aluminum hydroxide at raw material stage is preferred to be 1~8, more preferably 2~7. Mohs hardness is one of the mechanical properties of a material, and is a measuring method widely used in the mineral industry. When the hardness of a material (such as aluminum hydroxide) is measured, the material is chafed using a reference material, and chafing, if any, is observed to determine its Mohs hardness. On the Mohs scale of hardness, diamond which is the top of the scale has a hardness of 10. The Mohs hardness of aluminum hydroxide increases when it is converted to alumina, and is greater than that of silica. Accordingly, its hardness exceeds that of the road surface stone, and excellent wear resistance and wet grip performance are thereby achieved.

As for the aluminum hydroxide, a commercially available product having properties such as the aforementioned average particle diameter and $N_2SA$ may be used. Also available is a product prepared by grinding aluminum hydroxide or the like to obtain particles with the aforementioned properties. When conducting a grinding process, known methods such as follows may be employed: wet grinding and dry grinding (jet mill, current-jet mill, counter-jet mill, contra-plex and the like). Depending on requirements, fractionation of particles is conducted by a membrane filtering method widely used in medical and biochemical fields, and particles with an average particle diameter and $N_2SA$ respectively having specific values are selected for use as an additive of a rubber.

Regarding wet silica in an embodiment of the present invention, the $N_2SA$ of wet silica is preferred to be 80 m²/g or greater, more preferably 110 m²/g or greater, even more preferably 150 m²/g or greater. In addition, the $N_2SA$ is preferred to be 300 m²/g or lower, more preferably 250 m²/g or lower, even more preferably 200 m²/g or lower. If it is lower than 80 m²/g, wear resistance may decrease, and if it exceeds 300 m²/g, roll processability and fuel efficiency may be lowered. The $N_2SA$ of wet silica is measured by the same method as used for measuring aluminum hydroxide.

The rubber composition related to the present invention may also include other filling material such as carbon black in addition to the aforementioned aluminum hydroxide and wet silica. For example, such filling material may be combined in the base kneading step mentioned above. Carbon black is not limited to any specific type, but particulate carbon black is preferred since the effects according to an embodiment of the present invention are well exhibited.

The $N_2SA$ of carbon black is preferred to be 80 m²/g or greater, more preferably 100 m²/g or greater. In addition, the $N_2SA$ is preferred to be 200 m²/g or lower, more preferably 180 m²/g or lower. If it is within such a range, the effects according to an embodiment of the present invention are well exhibited. The $N_2SA$ of carbon black is measured by the method "A" specified in JIS K6217.

When wet silica is kneaded in the base kneading step, a silane coupling agent may also be added at the same time. For example, a silane coupling agent represented by formula (I) below is preferred to be used. By combining a silane coupling agent represented by formula (I) below along with the aforementioned conjugated diene polymer and silica, silica is dispersed well, thereby significantly improving wet grip performance and wear resistance. Also, since the silane coupling agent represented by formula (I) below is less likely to cause scorching, the kneaded material is discharged at high temperature during production.

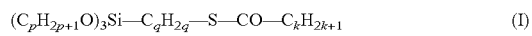

$$(C_pH_{2p+1}O)_3Si—C_qH_{2q}—S—CO—C_kH_{2k+1} \quad (I)$$

(in the above formula, "p" is a whole number of 1~3, "q" is a whole number of 1~5, and "k" is a whole number of 5~12)

Although "p" is set to be a whole number of 1~3, 2 is preferred. If "p" is 4 or greater, coupling reactions tend to be slow.

Although "q" is set to be a whole number of 1~5, 2~4 is preferred and 3 is more preferred. If "q" is 0 or no smaller than 6, synthesis is hard to progress.

Although "k" is set to be a whole number of 5~12, 5~10 is preferred, 6~8 is more preferable, and 7 is even more preferable.

Examples of a silane coupling agent represented by formula (I) above are NXT made by Momentive Performance Materials, Ltd. and the like. The silane coupling agent represented by formula (I) above may be used alone or in combination with other silane coupling agents such as NXT-Z45 made by Momentive Performance Materials, Ltd., Si69 and Si75 made by Evonik-Degussa GmbH and the like.

In an embodiment of the present invention, a softening agent may be added and such a softening agent may be combined in the base kneading step. Examples of softening agents are process oils and resins such as C5 petroleum resin, C9 petroleum resin, terpene resin, coumarone-indene resin, aromatic vinyl polymers and the like. Among those, especially preferred are terpene resin, process oil, coumarone-indene resin and aromatic vinyl polymer. An aromatic vinyl polymer is especially preferred to be used for summer tires, and terpene resin and coumarone-indene resin are especially preferred for studless tires.

Examples of process oils are paraffinic process oil, aromatic process oil, naphthenic process oil and the like. Such process oils are generally in a liquid state at room temperature (20° C.).

Examples of terpene-based resins are terpene resins and terpene phenol resins and the like. The softening point of terpene resins is preferred to be 51~140° C., more preferably 90~130° C.

Coumarone-indene resins contain coumarone and indene as monomer components that form the resin skeleton (main chain). In addition to coumarone and indene, monomer components included in the skeleton are styrene, α-methylstyrene, methyl indene, vinyl toluene and the like. Here, the softening point of a coumarone-indene resin is preferred to be lower than 51° C., more preferably −10~30° C.

As for an aromatic vinyl polymer, styrene and α-methylstyrene are used as an aromatic vinyl monomer (unit). Either a homopolymer of each monomer or a copolymer of both monomers may be employed. A homopolymer of α-methylstyrene or styrene or a copolymer of α-methylstyrene and styrene is preferred as the aromatic vinyl polymer, since such a polymer is economical and easy to process and is excellent in wet skid performance. A copolymer of α-methylstyrene and styrene or a homopolymer of styrene is more preferred. The softening point of an aromatic vinyl polymer is preferred to be 51~140° C., more preferably 80~130° C. The softening point of a softening agent is measured according to JIS K 6220-1: 2001 using a ring and ball softening point tester, and is set at the temperature when the ball is dropped.

In addition to the aforementioned components, a rubber composition according to an embodiment of the present invention may also combine additives generally used in the tire industry such as wax, zinc oxide, anti-aging agents and the like as needed. Such material may be kneaded in the base kneading step, for example.

The base kneading step for kneading the rubber component, aluminum hydroxide, wet silica and the like is carried out by kneading those components using a kneading machine. As a kneading machine, a conventional type, for example, a Banbury mixer, a kneader, an open roll or the like may be used.

In the base kneading step and the like, in which at least the rubber component and aluminum hydroxide are kneaded (for example, if the base kneading step is conducted in a single step, it indicates the single kneading step; and if the base kneading step is divided into multiple steps as described later, it indicates the kneading step in which aluminum hydroxide is added into the rubber component and both are kneaded), the discharge temperature is set at 150° C. or higher, preferably at 155° C. or higher, more preferably at 160° C. or higher, even more preferably at 165° C. or higher, and especially preferably at 170° C. or higher. Since the endothermic peak of the pyrolysis starting temperature of aluminum hydroxide (DSC endothermic starting temperature) is 220~350° C., aluminum hydroxide is appropriately converted to alumina when the discharge temperature is set in the above range. Accordingly, effects (1)~(3) described above are achieved in a well-balanced manner, and wet grip performance is significantly improved. If the discharge temperature is set lower than 150° C., the amount of aluminum hydroxide in the rubber composition to be converted to alumina will be little, likely lowering wet grip performance. On the other hand, the upper limit of the discharge temperature is not limited specifically, and is properly adjusted in a range that will not cause scorching so that a desired performance is achieved. The discharge temperature is preferred to be set at 190° C. or lower, more preferably at 185° C. or lower.

The base kneading step is not limited specifically as long as the rubber component, aluminum hydroxide and others are kneaded. In addition to a method for conducting a base kneading step in one step, a base kneading step may be divided into multiple steps such as an X kneading step for kneading the rubber component, half the silica and half the silane coupling agent; a Y kneading step for kneading the kneaded material obtained in the X kneading step, the remaining silica, carbon black, the remaining silane coupling agent, other components excluding sulfur and a vulcanization accelerator; and a Z kneading step for re-kneading the kneaded material obtained in the Y kneading step. In such a method, the timing for kneading the aluminum hydroxide may be selected in any of the X kneading, Y kneading and Z kneading steps.

After the above base kneading step, a finish kneading step (at a discharge temperature of 80~110° C., for example) is conducted by adding components—for example, a vulcanization agent such as sulfur, a vulcanization accelerator or the like—into the kneaded material 1 obtained above using the same kneading machine, and by further conducting a vulcanization step for vulcanization reactions on the kneaded material 2 (unvulcanized rubber composition) at 130~190° C. for 5~30 minutes. Accordingly, a rubber composition according to an embodiment of the present invention is produced.

In the rubber composition obtained by the above production method or the like, the amount of diene rubber to be combined in 100 mass % of the rubber component is preferred to be 30 mass % or greater, more preferably 70 mass % or greater, even more preferably 80 mass % or greater from the viewpoint of achieving excellent effects according to an embodiment of the present invention. The amount may be 100 mass %.

Especially, when a rubber composition for summer tires contains BR, the amount of BR to be combined in 100 mass % of the rubber component is preferred to be 10 mass % or greater, more preferably 20 mass % or greater. The amount is preferred to be 80 mass % or less, more preferably 75 mass % or less, even more preferably 70 mass % or less. If the amount exceeds 80 mass %, chipping performance and wet grip performance may decrease. When aiming for super dry grip performance, combining SBR and NR is preferred. Combining BR is optional.

To produce a rubber composition for summer tires, the amount of SBR to be combined in 100 mass % of the rubber component is preferred to be 10 mass % or greater, more preferably 20 mass % or greater and even more preferably 30 mass % or greater. The upper limit of the amount is not specifically restricted. It may be 100 mass %, but 90 mass % or less is preferable. If the amount is less than 10 mass %, grip performance may decrease, and it may be hard to prevent a reversion phenomenon.

Meanwhile, to produce a rubber composition for studless tires, the amount of BR to be combined in 100 mass % of the rubber component is preferred to be 30 mass % or greater, more preferably 40 mass % or greater and even more preferably 50 mass % or greater. The amount is preferred to be 90 mass % or less, more preferably 80 mass % or less and even more preferably 70 mass % or less. If the amount is less than 30 mass %, low-temperature performances (performance on ice, wet grip performance) may decrease, and if the amount exceeds 90 mass %, dry grip performance and roll processability may decrease.

To produce a rubber composition for studless tires, the amount of isoprene rubber to be combined in 100 mass % of the rubber component is preferred to be 10 mass % or greater, more preferably 20 mass % or greater and even more preferably 30 mass % or greater. The amount is preferred to be 80 mass % or less, more preferably 70 mass % or less and even more preferably 60 mass % or less. If the amount is less than 10 mass %, dry grip performance and roll processability may decrease, and if the amount exceeds 80 mass %, low-temperature performances (performance on ice, wet grip performance) may decrease.

In a rubber composition according to an embodiment of the present invention obtained by the above method or the like, the amount of the aforementioned aluminum hydroxide is set at no less than 1 part by mass, preferably at no less than 3 parts by mass, more preferably at no less than 5 parts by mass, based on 100 parts by mass of the rubber component. If the amount is less than 1 part by mass, sufficient wet grip performance may not be achieved. In addition, the amount is preferred to be no greater than 60 parts by mass, more preferably no greater than 50 parts by mass, even more preferably no greater than 30 parts by mass, and even further preferably no greater than 20 parts by mass. If the amount exceeds 60 parts by mass, wear resistance may deteriorate to the point that no other mixing agent can compensate for the low resistance.

Based on 100 parts by mass of the rubber component, the amount of the aforementioned wet silica is preferred to be no less than 15 parts by mass, more preferably no less than 20 parts by mass, even more preferably no less than 40 parts by mass. If the amount is less than 15 parts by mass, sufficient wear resistance and wet grip performance may not be achieved. In addition, the amount is preferred to be no greater than 130 parts by mass, more preferably no greater than 110 parts by mass, and even more preferably no greater than 100 parts by mass. If the amount exceeds 130 parts by mass, fuel efficiency may decrease.

When carbon black is added, the total amount of the above silica and carbon black is preferred to be 30~180 parts by mass, more preferably 45~135 parts by mass based on 100 parts by mass of the rubber component. Especially for a rubber composition for summer tires, the total amount to be combined is preferred to be 50~160 parts by mass, more preferably 65~130 parts by mass based on 100 parts by mass of the rubber component. On the other hand, to produce studless tires, the amount of silica to be combined is preferred to be 25~140 parts by mass, more preferably 50~110 parts by mass based on 100 parts by mass of the rubber component.

The amount of the silane coupling agent represented by formula (I) above is preferred to be no less than 0.1 part by mass, more preferably no less than 2 parts by mass, even more preferably no less than 4 parts by mass, based on 100 parts by mass of the wet silica. If the amount is less than 0.1 part by mass, it is difficult to sufficiently disperse silica or to prevent silica from reaggregating, thereby lowering fuel efficiency, processability and wear resistance. In addition, the amount is preferred to be no greater than 20 parts by mass, more preferably no greater than 16 parts by mass, even more preferably no greater than 12 parts by mass. If the amount exceeds 20 parts by mass, effects corresponding to an increase in cost tend not to be achieved. Moreover, the excess amount causes the unreacted coupling agent to accumulate on the roll surface.

In a rubber composition according to an embodiment of the present invention obtained by the above method or the like, the amount of a process oil is preferred to be 1~40 parts by mass, more preferably 2~32 parts by mass, even more preferably 7~20 parts by mass, based on 100 parts by mass of the rubber component. The amount of a resin is preferred to be 1~50 parts by mass, more preferably 2~40 parts by mass, based on 100 parts by mass of the rubber component.

In a rubber composition according to an embodiment of the present invention, the amount of a process oil that is liquid at room temperature, the amount of a resin with a softening point lower than 51° C. and the amount of a resin with a softening point of 51~140° C. are preferred to satisfy the formula below.

1.0×(amount of process oil that is liquid at room temperature)+0.6×(amount of resin having a softening point lower than 51° C.)+0.4×(amount of resin having a softening point of 51~140° C.)≤35

(in the above formula, the amounts of process oil and resins indicate parts by mass based on 100 parts by mass of the rubber component)

Namely, conversion to alumina and conjugation with silica are facilitated in the aluminum hydroxide when the value of the actual softening effect obtained by "1.0×(amount of process oil that is liquid at room temperature)+0.6×(amount of resin having a softening point lower than 51° C.)+0.4×(amount of resin having a softening point of 51~140° C.)," that is, when the actual softening effect value, reflecting the degree of a softening effect obtained by considering not only the amount of the softening agent but also the process oil and the softening points of resins, is 35 or lower.

A rubber composition according to an embodiment of the present invention is preferred to further satisfy the following formula:

(total amount of wet silica and carbon black)/[1.0×(amount of process oil that is liquid at room temperature)+0.6×(amount of resin having a softening point lower than 51° C.)+0.4×(amount of resin having a softening point of 51~140° C.)]≥2.0

The Mooney viscosity $ML_{(1+4)}$ at 130° C. of a rubber composition according to an embodiment of the present invention is preferred to be 50 or greater, more preferably 52~90. If set within such a range, the effects according to an embodiment of the present invention are fully exhibited. The Mooney viscosity is the value at 130° C. measured according to JIS K6300-1.

A rubber composition according to an embodiment of the present invention can be used for each member of a tire, and is especially suitable when used for a tread.

A pneumatic tire according to an embodiment of the present invention is produced using the above rubber composition by a regular method. Namely, before vulcanization treatment, a rubber composition with various additives combined therein as needed is processed through extrusion into the shape of a tire tread, molded on a tire molding machine, and further laminated with other tire members to produce an unvulcanized tire. Then, heat and pressure are applied to the unvulcanized tire in a vulcanization apparatus. Accordingly, a pneumatic tire is obtained.

A pneumatic tire according to an embodiment of the present invention is suitable as a tire for passenger cars, large-size passenger cars and large-size SUVs, and as heavy-duty tires for trucks and buses, and tires for light trucks. Those tires are also applicable as summer tires or studless tires.

Examples

The present invention is described in detail according to the examples. However, the present invention is not limited to those examples.

Preparation of Terminal Modifier

Under a nitrogen atmosphere, 23.6 grams of 3-(N,N-dimethylamino)propyl trimethoxysilane (made by AZmax Co., Ltd.) is put into a 100 mL measuring flask, and anhydrous hexane (made by Kanto Kagaku Co., Inc.) is further added to make the total amount of 100 mL.

Production Example 1 of Copolymer

In a pressure-resistant vessel fully substituted with nitrogen, 18 L of n-hexane, 740 grams of styrene (made by Kanto Kagaku), 1260 grams of butadiene and 10 mmol of tetramethylethylenediamine are added and the temperature is increased to 40° C. Next, 10 mL of butyllithium is added and the temperature is increased to 50° C. and the mixture is stirred for 3 hours. Next, after 11 mL of the above terminal modifier is added, the mixture is stirred for 30 minutes. Then, 15 mL of methanol and 0.1 gram of 2,6-tert-butyl-p-cresol are added to the reaction solution, the reaction solution is put into a stainless-steel vessel containing 18 L of methanol, and the aggregate is collected. The obtained aggregate is dried for 24 hours under reduced pressure and modified SBR is obtained. Its Mw is 270,000, the vinyl content is 56%, and the styrene content is 37 mass %.

The Mw, vinyl content and styrene content of the obtained modified SBR are analyzed by the following methods.

Measurement of Weight-Average Molecular Weight (Mw)

The weight-average molecular weight "Mw" of the modified SBR is obtained based on the value measured by using gel permeation chromatography (GPC) (GPC-8000 Series, made by Tosoh Corporation, detection device: refractive index detector, column: TSKgel SuperMaltpore HZ-M, made by Tosoh) and converted in terms of standard polystyrene.

Measurement of Vinyl Content and Styrene Content

Using an apparatus of JNM-ECA series made by JEOL Ltd., the structure of the modified SBR is identified. From the measurement results, the vinyl content and styrene content in the modified SBR are measured.

Various chemicals used in the examples and comparative examples are all described in the following.

NR: TSR 20

BR: CB 25, made by Lanxess (high-cis BR synthesized by an Nd-based catalyst, Tg: −110° C.)

SBR: modified SBR prepared in copolymer production example 1 carbon black 1: HP 160, made by Columbian Carbon Company ($N_2SA$: 165 $m^2/g$)

carbon black 2: Show Black N220, made by Cabot Japan K.K. ($N_2SA$: 111 $m^2/g$)

silica 1: Z115Gr, made by Rhodia Japan ($N_2SA$: 115 $m^2/g$)

silica 2: ULTRASIL VN3, made by Evonik Industries ($N_2SA$: 175 $m^2/g$)

alumina: 60P1, made by Sumitomo Chemical Co., Ltd. (average particle diameter: 0.03 μm, $N_2SA$: 61 $m^2/g$, Mohs hardness: 9)

aluminum hydroxide 1: dry ground product of ATH #B (average particle diameter: 0.15 μm, $N_2SA$: 61 $m^2/g$, Mohs hardness: 3, Mohs hardness of pyrolysate (alumina): 9)

aluminum hydroxide 2: dry ground product of ATH #B (average particle diameter: 0.21 μm, $N_2SA$: 55 $m^2/g$, Mohs hardness: 3, Mohs hardness of pyrolysate (alumina): 9)

aluminum hydroxide 3: dry ground product of ATH #B (average particle diameter: 0.25 μm, $N_2SA$: 45 $m^2/g$, Mohs hardness: 3, Mohs hardness of pyrolysate (alumina): 9)

aluminum hydroxide 4: dry ground product of ATH #B (average particle diameter: 0.4 μm, $N_2SA$: 34 $m^2/g$, Mohs hardness: 3, Mohs hardness of pyrolysate (alumina): 9)

aluminum hydroxide 5: ATH #B, made by Sumitomo Chemical (average particle diameter: 0.6 μm, $N_2SA$: 15 $m^2/g$, Mohs hardness: 3, Mohs hardness of pyrolysate (alumina): 9)

aluminum hydroxide 6: ATH #C, made by Sumitomo Chemical (average particle diameter: 0.8 μm, $N_2SA$: 7.0 $m^2/g$, Mohs hardness: 3, Mohs hardness of pyrolysate (alumina): 9)

aluminum hydroxide 7: C-301N, made by Sumitomo Chemical (average particle diameter: 1.0 μm, $N_2SA$: 4.0 $m^2/g$, Mohs hardness: 3, Mohs hardness of pyrolysate (alumina): 9)

aluminum hydroxide 8: C-303, made by Sumitomo Chemical (average particle diameter: 3.1 μm, $N_2SA$: 2.0 $m^2/g$, Mohs hardness: 3, Mohs hardness of pyrolysate (alumina): 9)

aluminum hydroxide 9: fractionation of ATH #C obtained by membrane filtering method (average particle diameter: 0.67 μm, $N_2SA$: 47 $m^2/g$, Mohs hardness: 3, Mohs hardness of pyrolysate (alumina): 9)

resin 1: Sylvares SA 85, made by Arizona Chemical (copolymer of α-methyl styrene and styrene, softening point: 85° C., Mw: 1000)

resin 2: YS resin PX1150N, made by Yasuhara Chemical Co., Ltd. (terpene resin (pinene polymer), softening point: 115° C.)

resin 3: Sylvares TP115, made by Arizona Chemical (terpene phenol resin, softening point: 115° C.)

resin 4: Novares C10, made by Rutgers Chemicals (liquid coumarone-indene resin, softening point: 10° C.)

oil 1: Diana Process PA32, made by The JX Nippon Oil & Energy Co. (mineral oil)

oil 2: Vivatec 500 (TDAE) made by H&R wax: Ozoace-0355, made by Nippon Seiro Co., Ltd.

anti-aging agent 1: Antigen 6C, made by Sumitomo Chemical (N-(1,3-dimethylbutyl)-N'-phenyl-p-phenylenediamine)

anti-aging agent 2: Nocrac 224, made by Ouchi Shinko Chemical Industrial Co., Ltd. (2,2,4-trimethyl-1,2-dihydroquinoline polymer)

stearic acid: stearic acid "Tsubaki," made by NOF Corporation process additive: WB16, made by Struktol (mixed product of fatty acid metal salt (fatty acid calcium) and fatty acid amide)

zinc oxide: Ginrei R, made by Toho Zinc Co., Ltd. (average particle diameter: 0.29 μm, $N_2SA$: 4 $m^2/g$)

silane coupling agent 1: Si69, made by Evonik Industries silane coupling agent 2: Si75, made by Evonik Industries silane coupling agent 3: NXT, made by Momentive Performance Materials, Ltd. (a silane coupling agent represented by formula (I) above, in which "p"=2, "q"=3 and "k"=7)

sulfur: HK-200-5, made by Hosoi Chemical K.K. (powder sulfur containing 5 mass % oil)

vulcanization accelerator 1: Nocceler-NS-G, made by Ouchi Shinko Chemical Industrial (N-tert-butyl-2-benzothiazolyl sulfonamide)

vulcanization accelerator 2: Nocceler-D, made by Ouchi Shinko Chemical Industrial (1,3-diphenyl gu'anidine)

Examples and Comparative Examples

According to the types and amounts of material to be combined and kneading conditions respectively shown in Table 1 for summer tires and in Table 2 for studless tires, the rubber component, half the silica and half the silane coupling agent are kneaded for 5 minutes using a Banbury mixer (X kneading). Next, the kneaded material obtained in the X kneading above, the remaining silica, all the carbon black and the remaining silane coupling agent are kneaded, and other components excluding sulfur and vulcanization accelerator are added and further kneaded for 5 minutes (Y kneading). Then, the kneaded material obtained in the Y kneading is kneaded again for 4 minutes (Z kneading). Next, sulfur and a vulcanization accelerator are added to the obtained kneaded material and kneaded for 4 minutes using an open roll. Accordingly, an unvulcanized rubber composition is obtained.

The obtained unvulcanized rubber composition is press-vulcanized for 12 minutes under a condition of 170° C. to obtain a vulcanized rubber composition. Also the obtained unvulcanized composition is molded into a tread shape, which is then laminated with other tire members on a tire molding machine and press vulcanized for 12 minutes under the condition of 170° C. Accordingly, test tires are obtained (tire size: 245/40R18). Alumina and aluminum hydroxide are added at their respective timings shown in Table 1 or 2.

The obtained unvulcanized tire compositions and test tires are evaluated as follows. Evaluation results are shown in Tables 1 and 2.

Wet Grip Performance

Test tires obtained above are respectively mounted on a domestic FR vehicle of 2000 cc displacement, and the vehicle is driven 10 laps on a test course with a wet asphalt road surface. During that time, the test driver evaluated steering stability and the results are shown as indices based on the results of comparative examples 1 and 13 set at 100 respectively. The degree of excellence of wet grip performance is indicated by higher index values. When the index is 105 or greater, the wet grip performance is excellent.

Wear Resistance

The test tires obtained above are respectively mounted on a domestic FR vehicle of 2000 cc displacement, and the vehicle is driven on a test course with a dry asphalt road surface. The remaining depth of the grooves in the tire tread rubber is measured after the test (8.0 mm on a new tire), and wear resistance is evaluated. The degree of excellence of wear resistance is indicated by the remaining depth of the grooves. The results are shown as indices based on the remaining depths of the grooves in comparative Examples 1 and 13 set as 100 respectively. The higher the index, the higher the indication of wear resistance. When the index is 85 or greater, wear resistance is excellent.

Roll Processability Index

At the heating and sheeting steps on an open roll, unvulcanized rubber compositions are each evaluated by visual inspection as to how well they wrapped around the roll, how smooth the sheet and edges are and the like. The results are shown as indices based on the results in comparative examples 1 and 13 set as 100 respectively (roll processability index). The excellence of heating, kneading and sheeting smoothly processed on the open roll and its processability are indicated by higher index values. When the index is 90 or greater, roll processability is excellent.

TABLE 1

| | | comp. example | | | | example | | | | | | comp. | example | | | | comp. | comp. example |
|---|---|---|---|---|---|---|---|---|---|---|---|---|---|---|---|---|---|---|
| | | 1 | 2 | 3 | 4 | 1 | 2 | 3 | 4 | 5 | 6 | 5 | 7 | 8 | 9 | 10 | 6 | 11 |
| material and amount (part by mass) | rubber composition for summer tire | | | | | | | | | | | | | | | | | |
| | NR | — | — | — | — | — | — | — | — | — | — | — | — | — | — | — | — | — |
| | BR | 30 | 30 | 30 | 30 | 30 | 30 | 30 | 30 | 30 | 30 | 30 | 30 | 30 | 30 | 30 | 30 | 30 |
| | SBR | 70 | 70 | 70 | 70 | 70 | 70 | 70 | 70 | 70 | 70 | 70 | 70 | 70 | 70 | 70 | 70 | 70 |
| | carbon black 1 | 5 | 5 | 5 | 5 | 5 | 5 | 5 | 5 | 5 | 5 | 5 | 5 | 5 | 5 | 5 | 5 | 5 |
| | carbon black 2 | — | — | — | — | — | — | — | — | — | — | — | — | — | — | — | — | — |
| | silica 1 (N₂SA: 115 m²/g) | 90 | 90 | 84 | 88 | 88 | 90 | 90 | 90 | 90 | 90 | 90 | 90 | 90 | 90 | 90 | 90 | 90 |
| | silica 2 (N₂SA: 175 m²/g) | — | — | — | — | — | — | — | — | — | — | — | — | — | — | — | — | — |
| | carbon black + silica (total parts by mass) | 95 | 95 | 89 | 93 | 93 | 95 | 95 | 95 | 95 | 95 | 95 | 95 | 95 | 95 | 95 | 95 | 95 |
| | alumina (average particle diameter: 30 nm, N₂SA: 61 m²/g) | — | — | 10 | — | — | — | — | — | — | — | — | — | — | — | — | — | — |
| | aluminum hydroxide 1 (average particle diameter: 0.15 μm, N₂SA: 61 m²/g) | — | — | — | 10 | — | — | — | — | — | — | — | — | — | — | — | — | — |
| | aluminum hydroxide 2 (average particle diameter: 0.21 μm, N₂SA: 55 m²/g) | — | — | — | — | 10 | — | — | — | — | — | — | — | — | — | — | — | — |
| | aluminum hydroxide 3 (average particle diameter: 0.25 μm, N₂SA: 45 m²/g) | — | — | — | — | — | 10 | — | — | — | — | — | — | — | — | — | — | — |
| | aluminum hydroxide 4 (average particle diameter: 0.4 μm, N₂SA: 34 m²/g) | — | — | — | — | — | — | 10 | — | — | — | — | — | — | — | — | — | — |
| | aluminum hydroxide 5 (average particle diameter: 0.6 μm, N₂SA: 15 m²/g) | — | — | — | — | — | — | — | 10 | — | — | — | — | — | — | — | — | — |
| | aluminum hydroxide 6 (average particle diameter: 0.8 μm, N₂SA: 7.0 m²/g) | — | — | — | — | — | — | — | — | 10 | — | — | — | — | — | — | — | — |
| | aluminum hydroxide 7 (average particle diameter: 1.0 μm, N₂SA: 4.0 m²/g) | — | — | — | — | — | — | — | — | — | 10 | — | — | — | — | — | — | — |
| | aluminum hydroxide 8 (average particle diameter: 3.1 μm, N₂SA: 2.0 m²/g) | — | — | — | — | — | — | — | — | — | — | 10 | — | — | — | — | — | — |
| | aluminum hydroxide 9 (average particle diameter: 0.67 μm, N₂SA: 47 m²/g) | — | — | — | — | — | — | — | — | — | — | — | 10 | — | — | — | — | — |
| | resin 1 (α-methylstyrene, softening point: 85° C.) | 10 | 10 | 10 | 10 | 10 | 10 | 10 | 10 | 10 | 10 | 10 | 10 | 10 | 10 | 10 | 10 | — |
| | resin 2 (terpene resin, softening point: 115° C.) | — | — | — | — | — | — | — | — | — | — | — | — | — | — | — | — | 10 |
| | resin 3 (terpene phenol resin, softening point: 115° C.) | — | — | — | — | — | — | — | — | — | — | — | — | — | — | — | — | — |
| | resin 4 (liquid coumarone-indene resin, softening point: 10° C.) | — | — | — | — | — | — | — | — | — | — | — | — | — | — | — | — | — |
| | oil 1 | 10 | 10 | 10 | 10 | 10 | 10 | 10 | 10 | 10 | 10 | 10 | 10 | 10 | 10 | 10 | 10 | 10 |
| | oil 2 | 14 | 14 | 14 | 14 | 14 | 14 | 14 | 14 | 14 | 14 | 14 | 14 | 14 | 14 | 14 | 14 | 14 |
| | actual softening effect value | 6.79 | 6.79 | 6.36 | 6.64 | 6.64 | 6.71 | 6.79 | 6.79 | 6.79 | 6.79 | 6.79 | 6.79 | 6.79 | 6.79 | 6.79 | 6.79 | 6.79 |
| | (carbon black + silica)/actual softening effect value | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | wax | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | anti-aging agent 1 | 1 | 1 | 1 | 1 | 1 | 1 | 1 | 1 | 1 | 1 | 1 | 1 | 1 | 1 | 1 | 1 | 1 |
| | anti-aging agent 2 | 3 | 3 | 3 | 3 | 3 | 3 | 3 | 3 | 3 | 3 | 3 | 3 | 3 | 3 | 3 | 3 | 3 |
| | stearic acid | — | — | 3 | 3 | 3 | 3 | 1 | — | — | — | — | — | — | — | — | — | — |
| | processing additive | — | — | — | — | — | — | — | — | — | — | — | — | — | — | — | — | — |

TABLE 1-continued

| | | comp. example 7 | comp. example 8 | example 12 | example 13 | comp. example 9 | comp. example 10 | example 14 | example 15 | example 16 | example 17 | example 18 | comp. 11 | example 19 | example 20 | example 21 | comp. example 12 |
|---|---|---|---|---|---|---|---|---|---|---|---|---|---|---|---|---|---|
| kneading condition | zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | silane-coupling agent 1 (Si69) | — | — | — | — | — | — | — | — | — | — | — | — | — | — | — | — |
| | silane-coupling agent 2 (Si75) | 7.2 | — | — | — | — | — | — | — | — | — | — | — | — | — | — | — |
| | silane-coupling agent 3 (NXT) | — | 5.4 | 5.4 | 5.4 | 5.4 | 5.4 | 5.4 | 5.4 | 5.4 | 5.4 | 5.4 | 5.4 | 5.4 | 5.4 | 5.4 | 5.4 |
| | sulfur | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| | vulcanization accelerator 1 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 |
| | vulcanization accelerator 2 | 2 | 2 | 2 | 2 | 2 | 2 | 2 | 2 | 2 | 2 | 2 | 2 | 2 | 2 | 2 | 2 |
| | X kneading discharge temperature | 160 | 175 | 175 | 175 | 175 | 175 | 175 | 175 | 175 | 175 | 175 | 175 | 175 | 175 | 175 | 175 |
| | Y kneading discharge temperature | 160 | 175 | 175 | 175 | 175 | 175 | 175 | 175 | 175 | 175 | 175 | 175 | 175 | 175 | 175 | 175 |
| | Z kneading discharge temperature | 130 | 130 | 130 | 130 | 130 | 130 | 130 | 130 | 130 | 130 | 130 | 130 | 130 | 130 | 130 | 130 |
| | finish kneading discharge temperature | 105 | 105 | 105 | 105 | 105 | 105 | 105 | 105 | 105 | 105 | 105 | 105 | 105 | 105 | 105 | 105 |
| | timing for adding aluminum hydroxide or alumina | — | — | Y | Y | Y | Y | Y | Y | Y | Y | Y | Y | X | Y | Y | Z |
| evaluation | final viscosity $ML_{(1+4)}$ @130° C. | 70 | 65 | 64 | 63 | 63 | 64 | 63 | 64 | 63 adjusted for 67-68 | 62 | 61 | 64 | 64 | 64 | 65 | 64 |
| | hardness (Hs) | 100 | 100 | 107 | 140 | 150 | 150 | 147 | 145 | 128 | 122 | 120 | 155 | 143 | 140 | 125 | 125 |
| | wet grip performance index target ≥105, higher-level target ≥130 | 100 | 110 | 85 | 92 | 100 | 105 | 103 | 100 | 88 | 85 | 82 | 102 | 99 | 100 | 82 | 100 |
| | wear resistance index target ≥85 | 100 | 105 | 75 | 85 | 90 | 98 | 100 | 102 | 103 | 104 | 105 | 104 | 102 | 100 | 87 | 97 |
| | roll processability index target ≥90 | 95 | — | — | — | — | — | — | — | — | — | — | — | — | — | — | — |

| | | comp. example 7 | comp. example 8 | example 12 | example 13 | comp. example 9 | comp. example 10 | example 14 | example 15 | example 16 | example 17 | example 18 | comp. 11 | example 19 | example 20 | example 21 | comp. example 12 |
|---|---|---|---|---|---|---|---|---|---|---|---|---|---|---|---|---|---|
| material and amount (part by mass) | rubber composition for summer tire | | | | | | | | | | | | | | | | |
| | NR | 30 | 30 | 30 | 30 | 30 | 30 | 10 | 10 | 10 | — | — | — | — | — | — | — |
| | BR | 70 | 70 | 70 | 70 | 70 | 70 | 20 | 20 | 20 | 30 | 30 | 30 | 30 | 30 | 50 | 60 |
| | SBR | 5 | 5 | 5 | 5 | 5 | 5 | 70 | 70 | 70 | 70 | 70 | 70 | 70 | 70 | 50 | 40 |
| | carbon black 1 | — | — | — | — | — | — | — | — | — | 15 | 10 | 5 | 5 | 5 | 5 | 5 |
| | carbon black 2 | — | — | — | — | — | — | — | — | — | — | — | — | — | — | — | — |
| | silica 1 ($N_2SA$: 115 $m^2/g$) | 90 | 90 | 90 | 90 | 90 | 90 | 100 | 110 | — | 50 | 70 | 90 | 90 | 88 | 82 | 60 |
| | silica 2 ($N_2SA$: 175 $m^2/g$) | — | — | — | — | — | — | — | — | 125 | — | — | — | — | — | — | — |
| | carbon black + silica (total parts by mass) | 95 | 95 | 95 | 95 | 95 | 95 | 105 | 115 | 130 | 65 | 80 | 95 | 95 | 93 | 87 | 65 |
| | alumina (average particle diameter: 30 nm, $N_2SA$: 61 $m^2/g$) | — | — | — | — | — | — | — | — | — | — | — | — | — | — | — | — |
| | aluminum hydroxide 1 (average particle diameter: 0.15 μm, $N_2SA$: 61 $m^2/g$) | — | — | — | — | — | — | 10 | 10 | 10 | 10 | 10 | 0.5 | 1 | 20 | 50 | 70 |
| | aluminum hydroxide 2 (average particle diameter: 0.21 μm, $N_2SA$: 55 $m^2/g$) | — | — | — | — | — | — | — | — | — | — | — | — | — | — | — | — |
| | aluminum hydroxide 3 (average particle diameter: 0.25 μm, $N_2SA$: 45 $m^2/g$) | — | — | — | — | — | — | — | — | — | — | — | — | — | — | — | — |
| | aluminum hydroxide 4 (average particle diameter: 0.4 μm, $N_2SA$: 34 $m^2/g$) | — | — | — | — | — | — | — | — | — | — | — | — | — | — | — | — |
| | aluminum hydroxide 5 (average particle diameter: 0.6 μm, $N_2SA$: 15 $m^2/g$) | 10 | — | — | — | — | — | — | — | — | — | — | — | — | — | — | — |
| | aluminum hydroxide 6 (average particle diameter: 0.8 μm, $N_2SA$: 7.0 $m^2/g$) | — | — | — | — | — | — | — | — | — | — | — | — | — | — | — | — |
| | aluminum hydroxide 7 (average particle diameter: 1.0 μm, $N_2SA$: 4.0 $m^2/g$) | — | — | — | — | — | — | — | — | — | — | — | — | — | — | — | — |
| | aluminum hydroxide 8 (average particle diameter: 2.0 $m^2/g$) | — | — | — | — | — | — | — | — | — | — | — | — | — | — | — | — |
| | aluminum hydroxide 9 (average particle | — | — | — | — | — | — | — | — | — | — | — | — | — | — | — | — |

TABLE 1-continued

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| diameter: 0.67 μm, N₂SA: 47 m²/g) | 10 | 10 | 10 | 10 | 10 | 10 | — | — | 10 | 10 | 10 | 10 | 10 | 10 |
| resin 1 (α-methylstyrene, softening point: 85° C.) | — | — | — | — | — | — | — | — | — | — | — | — | — | — |
| resin 2 (terpene resin, softening point: 115° C.) | — | — | — | — | — | — | — | — | — | — | — | — | — | — |
| resin 3 (terpene phenol resin, softening point: 115° C.) | — | — | — | — | — | — | 10 | 10 | — | — | — | — | — | — |
| resin 4 (liquid coumarone-indene resin, softening point: 10° C.) | — | — | — | — | — | — | 10 | 10 | — | — | — | — | — | — |
| oil 1 | 10 | 10 | 10 | 10 | 10 | — | — | — | — | 10 | 10 | 10 | 10 | 10 |
| oil 2 | 14 | 14 | 14 | 14 | 14 | 6 | 11 | 28 | 2 | 6 | 14 | 14 | 14 | 14 |
| actual softening effect value | 6.79 | 6.79 | 6.79 | 6.79 | 6.79 | 13.3 | 5.00 | 3.03 | 10.8 | — | 6.79 | 6.64 | 6.21 | 4.64 |
| (carbon black + silica)/actual softening effect value | 1.5 | 1.5 | 1.5 | 1.5 | 1.5 | 1.5 | 1.5 | 1.5 | 1.5 | 1.5 | 1.5 | 1.5 | 1.5 | 1.5 |
| wax | 2.5 | 2.5 | 2.5 | 2.5 | 2.5 | 2.5 | 2.5 | 2.5 | 2.5 | 2.5 | 2.5 | 2.5 | 2.5 | 2.5 |
| anti-aging agent 1 | 1 | 1 | 1 | 1 | 1 | 1 | 1 | 1 | 1 | 1 | 1 | 1 | 1 | 1 |
| anti-aging agent 2 | 3 | 3 | 3 | 3 | 3 | 3 | 3 | 3 | 3 | 3 | 3 | 3 | 3 | 3 |
| stearic acid | — | — | — | — | — | — | — | — | — | — | — | — | — | — |
| processing additive | — | — | — | — | — | 2 | 2 | 2 | 2 | — | — | — | — | — |
| zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 |
| silane-coupling agent 1 (Si69) | — | — | — | 7.2 | 7.2 | — | — | — | — | — | — | — | — | — |
| silane-coupling agent 2 (Si75) | 5.4 | 5.4 | — | — | — | — | — | — | — | 5.4 | 5.4 | — | — | 7.2 |
| silane-coupling agent 3 (NXT) | 1.50 | 1.50 | 1.50 | 1.50 | 1.50 | 3 | 6.6 | 6.6 | 6.6 | 4.2 | — | — | — | 1.50 |
| sulfur | 1.7 | 1.7 | 1.7 | 1.7 | 1.7 | 1.50 | 1.50 | 1.50 | 1.50 | 1.50 | 1.50 | 1.50 | 1.50 | 1.7 |
| vulcanization accelerator 1 | 2 | 2 | 2 | 2 | 2 | 2.7 | 1.7 | 1.7 | 1.7 | 2.2 | 1.7 | 1.7 | 1.7 | 2 |
| vulcanization accelerator 2 | — | — | — | — | — | 2 | 2 | 2 | 2 | 2 | 2 | 2 | 2 | — |
| kneading condition — X kneading discharge temperature | 175 | 175 | 155 | 155 | 135 | 175 | 175 | 175 | 175 | 175 | 175 | 175 | 175 | 175 |
| Y kneading discharge temperature | 175 | 175 | 155 | 155 | 135 | 175 | 175 | 175 | 175 | 175 | 175 | 175 | 175 | 175 |
| Z kneading discharge temperature | 130 | 130 | 130 | 130 | 130 | 130 | 130 | 130 | 130 | 130 | 130 | 130 | 130 | 130 |
| finish kneading discharge temperature | 105 | 105 | 105 | 105 | 105 | 105 | 105 | 105 | 105 | 105 | 105 | 105 | 105 | 105 |
| timing for adding aluminum hydroxide or alumina | Z | F | Y | X | X | Y | Y | Y | Y | Y | Y | Y | Y | Y |
| evaluation — final viscosity ML(1+4) @130° C. | 64 | 64 | 67 | 67 | 69 | 52 | 77 | 85 | 90 adjusted for 67-68 | 58 | 63 | 63 | 67 | 72 | 74 |
| hardness (Hs) | 104 | 100 | 127 | 124 | 103 | 125 | 149 | 153 | 150 | 145 | 102 | 105 | 155 | 142 | 127 |
| wet grip performance index target ≥105, higher-level target ≥130 | 95 | 94 | 95 | 91 | 91 | 92 | 94 | 89 | 85 | 104 | 108 | 98 | 86 | 97 | 100 |
| wear resistance index target ≥85 | 87 | 86 | 93 | 90 | 85 | 115 | 100 | 92 | 90 | 110 | 105 | 104 | 92 | 90 | unable to process |
| roll processability index target ≥90 | | | | | | | | | | | | | | | |

TABLE 2

| material and amount (part by mass) | | comp. example 13 | comp. example 14 | example 22 | example 23 | example 24 | example 25 | example 26 | comp. example 15 | example 27 | example 28 | example 29 | example 30 |
|---|---|---|---|---|---|---|---|---|---|---|---|---|---|
| rubber composition for studless tire | NR | 40 | 40 | 40 | 40 | 40 | 40 | 40 | 40 | 35 | 35 | 40 | 40 |
| | BR | 60 | 60 | 60 | 60 | 60 | 60 | 60 | 60 | 65 | 65 | 60 | 60 |
| | SBR | — | — | — | — | — | — | — | — | — | — | — | — |
| | carbon black 1 | 5 | — | 5 | 5 | 5 | 5 | 5 | 5 | — | 5 | 5 | 5 |
| | carbon black 2 | — | — | — | — | — | — | — | — | — | — | — | — |
| | silica 1 | 62 | 62 | 62 | 62 | 62 | 62 | 62 | 62 | 60 | 57 | 62 | 62 |
| | silica 2 | — | — | — | — | — | — | — | — | — | — | — | — |
| | carbon black + silica (total parts by mass) | 67 | 67 | 67 | 67 | 67 | 67 | 67 | 67 | 65 | 62 | 67 | 67 |
| | alumina (average particle diameter: 30 nm, $N_2SA$: 61 m$^2$/g) | — | — | — | — | — | — | — | — | — | — | — | — |
| | aluminum hydroxide 1 (average particle diameter: 0.15 μm, $N_2SA$: 61 m$^2$/g) | — | — | — | — | — | — | — | — | — | — | — | — |
| | aluminum hydroxide 2 (average particle diameter: 0.21 μm, $N_2SA$: 55 m$^2$/g) | — | — | 10 | — | — | — | — | — | — | — | — | — |
| | aluminum hydroxide 3 (average particle diameter: 0.25 μm, $N_2SA$: 45 m$^2$/g) | — | — | — | 10 | — | — | — | — | — | — | — | — |
| | aluminum hydroxide 4 (average particle diameter: 0.4 μm, $N_2SA$: 34 m$^2$/g) | — | — | — | — | 10 | — | — | — | — | — | — | — |
| | aluminum hydroxide 5 (average particle diameter: 0.6 μm, $N_2SA$: 15 m$^2$/g) | — | — | — | — | — | 10 | — | — | — | — | — | — |
| | aluminum hydroxide 6 (average particle diameter: 0.8 μm, $N_2SA$: 7.0 m$^2$/g) | — | — | — | — | — | — | 10 | 10 | 20 | 30 | 10 | 10 |
| | aluminum hydroxide 7 (average particle diameter: 1.0 μm, $N_2SA$: 4.0 m$^2$/g) | — | — | — | — | — | — | — | — | — | — | — | — |
| | aluminum hydroxide 8 (average particle diameter: 3.1 μm, $N_2SA$: 2.0 m$^2$/g) | — | — | — | — | — | — | — | — | — | — | — | — |
| | resin 1 (α-methylstyrene, softening point: 85° C.) | 8 | — | — | — | — | — | — | — | — | — | — | — |
| | resin 2 (terpene resin, softening point: 115° C.) | — | 25 | 25 | 25 | 25 | 25 | 25 | 25 | 25 | 25 | 5 | 25 |
| | resin 3 (terpene phenol resin, softening point: 115° C.) | — | — | — | — | — | — | — | — | — | — | — | — |
| | resin 4 (liquid coumarone-indene resin, softening point: 10° C.) | — | — | — | — | — | — | — | — | — | — | — | — |
| | oil 1 | 22 | 5 | 5 | 5 | 5 | 5 | 5 | 5 | 5 | 5 | 5 | 5 |
| | oil 2 | 12 | 17 | 17 | 17 | 17 | 17 | 17 | 17 | 17 | 17 | 22 | 7 |
| | actual softening effect value | 37.2 | 30 | 30 | 30 | 30 | 30 | 30 | 30 | 30 | 30 | 37 | 20 |
| | (carbon black + silica)/actual softening effect value | 1.80 | 2.23 | 2.23 | 2.23 | 2.23 | 2.23 | 2.23 | 2.23 | 2.17 | 2.07 | 1.81 | 3.35 |
| | wax | 1.5 | 1.5 | 1.5 | 1.5 | 1.5 | 1.5 | 1.5 | 1.5 | 1.5 | 1.5 | 1.5 | 1.5 |
| | anti-aging agent 1 | 2 | 2 | 2 | 2 | 2 | 2 | 2 | 2 | 2 | 2 | 2 | 2 |
| | anti-aging agent 2 | 1 | — | 1 | 1 | 1 | 1 | 1 | 1 | 1 | 1 | 1 | 1 |
| | stearic acid | 3 | 3 | 3 | 3 | 3 | 3 | 3 | 3 | 3 | 3 | 3 | 3 |
| | processing additive | — | — | — | — | — | — | — | — | — | — | — | — |
| | zinc oxide | 2.5 | 2.5 | 2.5 | 2.5 | 2.5 | 2.5 | 2.5 | 2.5 | 2.5 | 2.5 | 2.5 | 2.5 |
| | silane-coupling agent 1 (Si69) | 4.8 | 4.8 | 4.8 | 4.8 | 4.8 | — | — | — | — | — | — | — |
| | silane-coupling agent 2 (Si75) | — | — | — | — | — | — | — | — | — | — | — | — |
| | silane-coupling agent 3 (NXT) | — | — | — | — | — | 3.6 | 3.6 | 3.6 | 3.6 | 3.6 | 3.6 | 3.6 |
| | sulfur | 0.70 | 0.70 | 0.70 | 0.70 | 0.70 | 0.70 | 0.70 | 0.70 | 0.70 | 0.70 | 0.70 | 0.70 |
| | vulcanization accelerator 1 | 2 | 2 | 2 | 2 | 2 | 2 | 2 | 2 | 2 | 2 | 2 | 2 |
| | vulcanization accelerator 2 | 3 | 3 | 3 | 3 | 3 | 3 | 3 | 3 | 3 | 3 | 3 | 3 |
| kneading condition | X kneading discharge temperature | 155 | 155 | 155 | 155 | 155 | 175 | 175 | 175 | 175 | 175 | 175 | 175 |
| | Y kneading discharge temperature | 155 | 155 | 155 | 155 | 155 | 175 | 175 | 175 | 175 | 175 | 175 | 175 |
| | Z kneading discharge temperature | none | none | none | none | none | none | none | none | none | none | none | none |
| | finish kneading discharge temperature | 105 | 105 | 105 | 105 | 105 | 105 | 105 | 105 | 105 | 105 | 105 | 105 |
| | timing for adding aluminum hydroxide | Y | Y | Y | Y | Y | Y | X | F | Y | Y | Y | Y |

TABLE 2-continued

|  | rubber composition for studless tire | comp. example 13 | comp. example 14 | example 22 | example 23 | example 24 | example 25 | example 26 | comp. example 15 | example 27 | example 28 | example 29 | example 30 |
|---|---|---|---|---|---|---|---|---|---|---|---|---|---|
| evaluation | final viscosity ML$_{(1+4)}$ @130° C. | 35 | 55 | 57 | 56 | 53 | 54 | 52 | 48 | 54 | 53 | 38 | 61 |
|  | hardness (Hs) |  |  |  |  |  | adjusted for 54-55 | adjusted for 54-55 |  |  |  |  |  |
|  | wet grip performance index target ≥105, higher-level target ≥130 | 100 | 105 | 127 | 115 | 110 | 135 | 133 | 104 | 140 | 137 | 108 | 140 |
|  | wear resistance index target ≥85 | 100 | 105 | 98 | 99 | 87 | 99 | 98 | 92 | 91 | 85 | 96 | 100 |
|  | roll processability index target ≥90 | 100 | 102 | 90 | 97 | 100 | 100 | 100 | 80 | 94 | 90 | 96 | 100 |

From the evaluation results shown in Tables 1 and 2, it is found that wet grip performance is improved while excellent wear resistance and roll processability are maintained in examples, namely, well-balanced improvement of those features is achieved in the examples, which contain aluminum hydroxide with an average particle diameter and a nitrogen adsorption specific surface area respectively set at predetermined values, and in which the discharge temperature at the kneading step when the aluminum hydroxide is added is 150° C. or higher.

A tread to make contact with road surfaces is required to exhibit various performances such as wet grip performance from a safety viewpoint or the like, and a method is proposed for improving such performances by adding aluminum hydroxide. However, since such a method has a disadvantage of lowering wear resistance, it is rarely applied to tires for regular roads. In addition, using that method decreases the processability of composition materials.

Also, there are other methods such as follows: controlling the tan δ curve by increasing the amounts of styrene and vinyl in solution-polymerized styrene-butadiene rubber or by using modified solution-polymerized styrene-butadiene rubber; setting a higher peak temperature in the tan δ curve by increasing the amount of silica; adding liquid resin; or the like. However, it is hard to improve wet grip performance while maintaining various other physical properties.

A rubber composition for tires according to an embodiment of the present invention is exhibits well-balanced improvement of wet grip performance, wear resistance and roll processability, and a pneumatic tire according to an embodiment of the present invention is produced by using such a rubber composition.

A rubber composition for tires according to an embodiment of the present invention contains a rubber component, aluminum hydroxide having an average particle diameter of 1.5 μm or smaller and a nitrogen adsorption specific surface area of 3~60 m²/g, and wet silica. The amount of aluminum hydroxide is 1~60 parts by mass based on 100 parts by mass of the rubber component, and the rubber composition is obtained by kneading at least the rubber component and the aluminum hydroxide at a discharge temperature of 150° C. or higher.

It is preferred that the aluminum hydroxide have an average particle diameter of 0.69 μm or smaller and a nitrogen adsorption specific surface area of 3~50 m²/g, the wet silica have a nitrogen adsorption specific surface area of 80~300 m²/g, and the amount of the wet silica be set at 15~130 parts by mass based on 100 parts by mass of the rubber component.

The amount of a process oil that is liquid at room temperature, the amount of resin having a softening point of lower than 51° C., and the amount of resin having a softening point of 51~140° C. are preferred to satisfy the following formula:

1.0×(amount of process oil that is liquid at room temperature)+0.6×(amount of resin having a softening point of lower than 51° C.)+0.4× (amount of resin having a softening point of 51~140° C.)≤35

(in the above formula, the respective amounts of process oil and resins indicate parts by mass based on 100 parts by mass of the rubber component)

The discharge temperature is preferred to be set at 165° C. or higher.

Based on 100 parts by mass of the rubber component, a silane coupling agent represented by formula (I) below is preferred to be contained at 0.120 parts by mass.

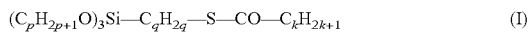

(in the above formula, "p" is a whole number of 1~3, "q" is a whole number of 1~5, and "k" is a whole number of 5~12)

The rubber composition is preferred to be used for a tire tread.

The present invention also relates to a pneumatic tire with a tread produced using the rubber composition for tires.

According to an embodiment of the present invention, a rubber composition for tires is obtained by combining a rubber component with aluminum hydroxide having an average particle diameter and a nitrogen adsorption specific surface area respectively set at specific predetermined values along with wet silica, and by kneading at least the rubber component and the aluminum hydroxide at a predetermined discharge temperature. Thus, balanced improvement is achieved in wet grip performance, wear resistance and roll processability.

Obviously, numerous modifications and variations of the present invention are possible in light of the above teachings. It is therefore to be understood that within the scope of the appended claims, the invention may be practiced otherwise than as specifically described herein.

What is claimed is:

1. A rubber composition for a tire, comprising:
   a rubber component;
   a plurality of aluminum hydroxide particles having an average particle diameter in a range of 1.5 μm or smaller and a nitrogen adsorption specific surface area in a range of 4.0 to 55 m²/g;
   a silane coupling agent;
   a wet silica; and
   a carbon black,
   wherein the aluminum hydroxide particles are in an amount in a range of 1 to 50 parts by mass relative to 100 parts by mass of the rubber component, the aluminum hydroxide particles, the wet silica, and the carbon black are in a total amount in a range of 85 to 140 parts by mass relative to 100 parts by mass of the rubber component, and the rubber composition is an unvulcanized rubber composition obtained by a process including kneading a mixture comprising the rubber component and the aluminum hydroxide particles and excluding sulfur and a vulcanization accelerator at a discharge temperature in a range of 155° C. or higher.

2. A rubber composition for a tire according to claim 1, wherein the aluminum hydroxide particles have an average particle diameter in a range of 0.69 μm or smaller and a nitrogen adsorption specific surface area in a range of 4.0 to 50 m²/g, and the wet silica has a nitrogen adsorption specific surface area in a range of 80 to 300 m²/g, and is in an amount set in a range of 15 to 130 parts by mass relative to 100 parts by mass of the rubber component.

3. A rubber composition for a tire according to claim 2, wherein the rubber composition has a Mooney viscosity, $ML_{1+4}$, in a range of 50 or higher at 130° C. and satisfies an equation, 1.0×(an amount of a process oil in liquid phase at room temperature)+0.6×(an amount of resin having a softening point of lower than 51° C.)+0.4×(an amount of resin having a softening point in a range of 51 to 140° C.)≤35, where the amount of the process oil and the amounts of the resin represent parts by mass relative to 100 parts by mass of the rubber component, and the process oil is in liquid phase at room temperature.

4. A rubber composition for a tire according to claim 2, wherein the silane coupling agent is in an amount in a range of 0.1 to 20 parts by mass relative to 100 parts by mass of the rubber component, and the silane coupling agent has formula, $(C_pH_{2p+1}O)_3Si-C_qH_{2q}-S-CO-C_kH_{2k+1}$, where p is a whole number in a range of 1 to 3, q is a whole number in a range of 1 to 5, and k is a whole number in a range of 5 to 12.

5. A rubber composition for a tire according to claim 1, wherein the rubber composition has a Mooney viscosity, $ML_{1+4}$, in a range of 50 or higher at 130° C. and satisfies an equation, 1.0×(an amount of a process oil in liquid phase at room temperature)+0.6×(an amount of resin having a softening point of lower than 51° C.)+0.4×(an amount of resin having a softening point in a range of 51 to 140° C.)≤35, where the amount of the process oil and the amounts of the resin represent parts by mass relative to 100 parts by mass of the rubber component, and the process oil is in liquid phase at room temperature.

6. A rubber composition for a tire according to claim 5, wherein the silane coupling agent is in an amount in a range of 0.1 to 20 parts by mass relative to 100 parts by mass of the rubber component, and the silane coupling agent has formula, $(C_pH_{2p+1}O)_3Si-C_qH_{2q}-S-CO-C_kH_{2k+1}$, where p is a whole number in a range of 1 to 3, q is a whole number in a range of 1 to 5, and k is a whole number in a range of 5 to 12.

7. A rubber composition for a tire according to claim 1, wherein the discharge temperature is set in a range of 155° C. to 190° C.

8. A rubber composition for a tire according to claim 7, wherein the silane coupling agent is in an amount in a range of 0.1 to 20 parts by mass relative to 100 parts by mass of the rubber component, and the silane coupling agent has formula, $(C_pH_{2p+1}O)_3Si-C_qH_{2q}-S-CO-C_kH_{2k+1}$, where p is a whole number in a range of 1 to 3, q is a whole number in a range of 1 to 5, and k is a whole number in a range of 5 to 12.

9. A rubber composition for a tire according to claim 1, wherein the silane coupling agent is in an amount in a range of 0.1 to 20 parts by mass relative to 100 parts by mass of the rubber component, and the silane coupling agent has formula, $(C_pH_{2p+1}O)_3Si-C_qH_{2q}-S-CO-C_kH_{2k+1}$, where p is a whole number in a range of 1 to 3, q is a whole number in a range of 1 to 5, and k is a whole number in a range of 5 to 12.

10. A rubber composition for a tire according to claim 1, wherein the discharge temperature is set in a range of 160° C. to 190° C.

11. A rubber composition for a tire according to claim 1, wherein the discharge temperature is set in a range of 170° C. to 185° C.

12. A tire tread, comprising:
the rubber composition of claim 1.

13. A pneumatic tire, comprising:
a tread comprising the rubber composition of claim 1.

14. A pneumatic tire, comprising:
a tread comprising the rubber composition of claim 2.

15. A method for producing a rubber composition for a tire, comprising:
combining a rubber component and a plurality of aluminum hydroxide particles having an average particle diameter in a range of 1.5 μm or smaller and a nitrogen adsorption specific surface area in a range of 4.0 to 55 m²/g; and
kneading a mixture comprising the rubber component and the aluminum hydroxide particles and excluding sulfur and a vulcanizing accelerator at a discharge temperature in a range of 155° C. or higher such that an unvulcanized rubber composition is obtained,
wherein the unvulcanized rubber composition includes the rubber component, the aluminum hydroxide particles, a silane coupling agent, a wet silica, and a carbon black, the aluminum hydroxide particles are in an amount in a range of 1 to 50 parts by mass relative to 100 parts by mass of the rubber component, and the aluminum hydroxide particles, the wet silica, and the carbon black are in a total amount in a range of 85 to 140 parts by mass relative to 100 parts by mass of the rubber component.

16. A method for producing a rubber composition for a tire according to claim 15, wherein the aluminum hydroxide particles have an average particle diameter in a range of 0.69 μm or smaller and a nitrogen adsorption specific surface area in a range of 4.0 to 50 m²/g, and the wet silica has a nitrogen adsorption specific surface area in a range of 80 to 300 m²/g, and is in an amount set in a range of 15 to 130 parts by mass relative to 100 parts by mass of the rubber component.

17. A method for producing a rubber composition for a tire according to claim 15, wherein the rubber composition has a Mooney viscosity, $ML_{1+4}$, in a range of 50 or higher at 130° C. and satisfies an equation, 1.0×(an amount of a process oil in liquid phase at room temperature)+0.6×(an amount of resin having a softening point of lower than 51° C.)+0.4×(an amount of resin having a softening point in a range of 51 to 140° C.)≤35, where the amount of the process oil and the amounts of the resin represent parts by mass relative to 100 parts by mass of the rubber component, and the process oil is in liquid phase at room temperature.

18. A method for producing a rubber composition for a tire according to claim 15, wherein the discharge temperature is set in a range of 155° C. to 190° C.

19. A method for producing a rubber composition for a tire according to claim 15, wherein the silane coupling agent is in an amount in a range of 0.1 to 20 parts by mass relative to 100 parts by mass of the rubber component, and the silane coupling agent has formula, $(C_pH_{2p+1}O)_3Si-C_qH_{2q}-S-CO-C_kH_{2k+1}$, where p is a whole number in a range of 1 to 3, q is a whole number in a range of 1 to 5, and k is a whole number in a range of 5 to 12.

20. A method for producing a rubber composition for a tire according to claim 15, wherein the kneading of the mixture comprises kneading the mixture comprising the rubber component, the aluminum hydroxide and the wet silica at the discharge temperature in the range of 155° C. to 190° C.

* * * * *